United States Patent
McConnell et al.

(10) Patent No.: US 12,141,129 B2
(45) Date of Patent: Nov. 12, 2024

(54) DELETING RELATED DATA DISTRIBUTED ACROSS APPLICATIONS

(71) Applicant: SAP SE, Walldorf (DE)

(72) Inventors: Lynn McConnell, San Jose, CA (US); Robert Koeten, Half Moon Bay, CA (US); Nilesh M P, Karnataka (IN)

(73) Assignee: SAP SE, Walldorf (DE)

( * ) Notice: Subject to any disclaimer, the term of this patent is extended or adjusted under 35 U.S.C. 154(b) by 374 days.

(21) Appl. No.: 17/556,631

(22) Filed: Dec. 20, 2021

(65) Prior Publication Data

US 2023/0195720 A1    Jun. 22, 2023

(51) Int. Cl.
    *G06F 16/23*    (2019.01)

(52) U.S. Cl.
    CPC ...... *G06F 16/2379* (2019.01); *G06F 16/2365* (2019.01)

(58) Field of Classification Search
    None
    See application file for complete search history.

(56) References Cited

U.S. PATENT DOCUMENTS

| | | | | |
|---|---|---|---|---|
| 6,601,076 B1* | 7/2003 | McCaw | ............... | G06F 16/273 707/999.203 |
| 2005/0147130 A1* | 7/2005 | Hurwitz | ............... | G06F 16/273 370/503 |
| 2021/0286616 A1* | 9/2021 | Singh | ............... | G06F 8/24 |

FOREIGN PATENT DOCUMENTS

EP    1887480 A1    2/2008

OTHER PUBLICATIONS

Cahin et al., " Policy-based Secure Deletion", IACR, International Association for Cryptologic Research, vol. 2013315 : 043608, Mar. 14, 2013, pp. 1-23.
European Patent Office, Extended European Search Report, EP Application No. 22193575.2, mailed Mar. 17, 2023, 10 pgs.

* cited by examiner

*Primary Examiner* — Scott A. Waldron
(74) *Attorney, Agent, or Firm* — Fountainhead Law Group, PC

(57) ABSTRACT

Some embodiments provide a program that receives a selection of a data object relationship definition. The data object relationship definition specifies a plurality of data objects managed by a plurality of applications and a set of relationships between data objects in the plurality of data objects. The program sends each application in a first subset of the plurality of applications a request for instances of data objects in the plurality of data objects managed by the application. The program receives, from each application in the first subset of the plurality of applications, a list of a set of candidate instances of data objects. Based on the list of the sets of candidate instances of data objects, the program further determines a set of groups of instances of data objects. The program deletes a group of instances of data objects in the set of groups of instances of data objects.

20 Claims, 9 Drawing Sheets

Data Object Relationship Definition
- Data Object Relationship ID ~205
- Data Object Metadata ~210
- Relationship Definitions ~215

Data Object Metadata
- Data Object ID ~305
- Application ~310
- Data Object Type ~315

Relationship Definition
- Relationship ID ~405
- Relationship Type ~410
- Data Object IDs ~415

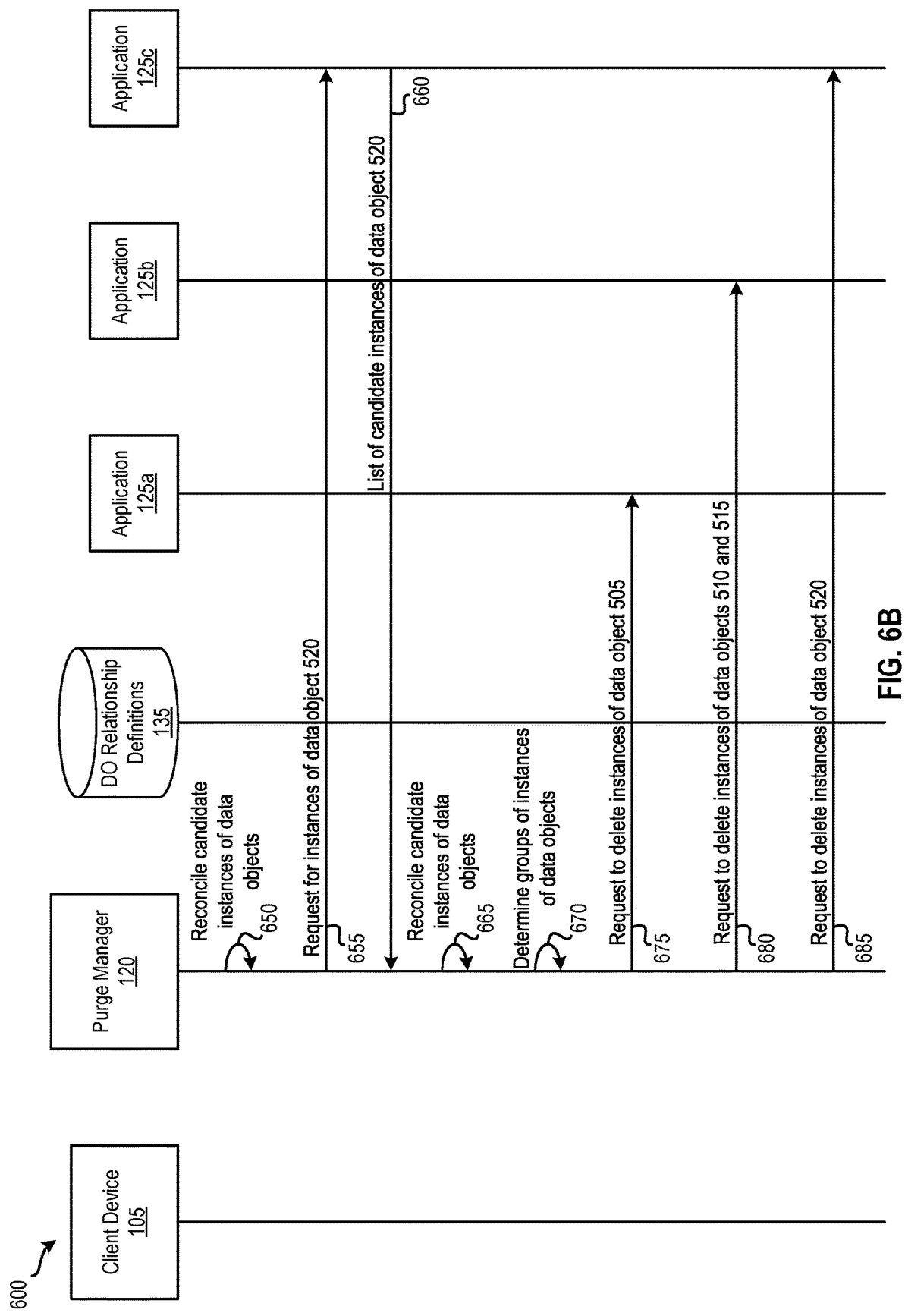

DELETING RELATED DATA DISTRIBUTED ACROSS APPLICATIONS

BACKGROUND

Many enterprise software applications are subject to data governance policies driven by internal company policies, industry specific regulations, contractual obligations, government regulations, etc. Controlled data deletion or purge is an important element of such policies. For example, specific classes of data may need to be retained as part of record management control as well as eventual deletion to limit a company's long-term risk & liability. Different classes or categories of data may be subject to different retention periods and policies, which may be triggered by different business events.

SUMMARY

In some embodiments, a non-transitory machine-readable medium stores a program executable by at least one processing unit of a device. The program receives a selection of a data object relationship definition. The data object relationship definition specifies a plurality of data objects managed by a plurality of applications and a set of relationships between data objects in the plurality of data objects. The program further sends each application in a first subset of the plurality of applications a first request for instances of data objects in the plurality of data objects managed by the application. The program also receives, from each application in the first subset of the plurality of applications, a list of a set of candidate instances of data objects. Based on the lists of sets of candidate instances of data objects, the program further determines a set of groups of instances of data objects. Each group of instances of data objects in the set of groups of instance of data objects form a complete set of instances of data objects related to one another according to the data object relationship definition. The program also deletes a group of instances of data objects in the set of groups of instances of data objects by sending each application in a second subset of the plurality of applications a second request to delete instances of data objects in the group of instances of data objects managed by the application.

In some embodiments, a relationship in the set of relationship may specify that a first data object managed by a first application in the plurality of applications is a copy of a second data object managed by a second application in the plurality of applications. The program may further determine instances of the first data object in the lists of sets of candidate instances of data objects that are copies of instances of the second data object in the lists of sets of candidate instances of data objects and include the determined instances of the first data object and the corresponding copies of the instances of the second data object in a list of candidate instances of data objects. Determining the set of groups of instances of data objects may be further based on the list of candidate instances of data objects. Only the determined instances of the first data object and the corresponding copies of the instances of the second data object may be included in the list of candidate instances of data objects. The program may further not include in the list of candidate instances of data objects instances of the first data object that are not copies of instances of the second data object and not include in the list of candidate instances of data objects instances of the second data object that do not have copies of instances of the first data object.

In some embodiments, a relationship in the set of relationship specifies that a first data object managed by a first application in the plurality of applications includes a reference to a second data object managed by a second application in the plurality of applications. Sending each application in the first subset of the plurality of applications the first request for instances of data objects in the plurality of data objects managed by the application may include sending the first application the first request for instances of the first data object. Receiving, from each application in the plurality of applications, the lists of the set of candidate instances of data objects may include receiving from the first application a list of a first set of candidate instances of the first data object. Sending each application in the first subset of the plurality of applications the first request for instances of data objects in the plurality of data objects managed by the application may further include, for each instance of the first data object in the list of the first set of candidate instances of the first data object, determining the reference to an instance of the second data object and sending the second application the references to the instances of the second data object and a request for the instances of the second data object. Receiving, from each application in the first subset of the plurality of applications, the list of the set of candidate instances of data objects may include receiving from the second application a list of a second set of candidate instances of the second data object.

In some embodiments, the set of groups of instances of data objects may be a first set of groups of instances of data objects. Based on the lists of sets of candidate instances of data objects, the program may further determine a second set of groups of instances of data objects, each group of instances of data objects in the second set of groups of instance of data objects missing an instance of at least one data object in the plurality of data objects specified in the data object relationship definition, and not delete the second set of groups of instances of data objects.

In some embodiments, a method receives a selection of a data object relationship definition. The data object relationship definition specifies a plurality of data objects managed by a plurality of applications and a set of relationships between data objects in the plurality of data objects. The method further sends each application in a first subset of the plurality of applications a first request for instances of data objects in the plurality of data objects managed by the application. The method also receives, from each application in the first subset of the plurality of applications, a list of a set of candidate instances of data objects. Based on the lists of sets of candidate instances of data objects, the method further determines a set of groups of instances of data objects. Each group of instances of data objects in the set of groups of instance of data objects form a complete set of instances of data objects related to one another according to the data object relationship definition. The method also deletes a group of instances of data objects in the set of groups of instances of data objects by sending each application in a second subset of the plurality of applications a second request to delete instances of data objects in the group of instances of data objects managed by the application.

In some embodiments, a relationship in the set of relationship may specify that a first data object managed by a first application in the plurality of applications is a copy of a second data object managed by a second application in the plurality of applications. The method may further determine instances of the first data object in the lists of sets of candidate instances of data objects that are copies of instances of the second data object in the lists of sets of candidate instances of data objects and include the determined instances of the first data object and the corresponding copies of the instances of the second data object in a list of candidate instances of data objects. Determining the set of groups of instances of data objects may be further based on the list of candidate instances of data objects. Only the determined instances of the first data object and the corresponding copies of the instances of the second data object may be included in the list of candidate instances of data objects. The method may further not include in the list of candidate instances of data objects instances of the first data object that are not copies of instances of the second data object and not include in the list of candidate instances of data objects instances of the second data object that do not have copies of instances of the first data object.

In some embodiments, a relationship in the set of relationship may specify that a first data object managed by a first application in the plurality of applications includes a reference to a second data object managed by a second application in the plurality of applications. Sending each application in the first subset of the plurality of applications the first request for instances of data objects in the plurality of data objects managed by the application may include sending the first application the first request for instances of the first data object. Receiving, from each application in the plurality of applications, the list of the set of candidate instances of data objects may include receiving from the first application a list of a first set of candidate instances of the first data object. Sending each application in the first subset of the plurality of applications the first request for instances of data objects in the plurality of data objects managed by the application further include, for each instance of the first data object in the list of the first set of candidate instances of the first data object, determining the reference to an instance of the second data object and sending the second application the references to the instances of the second data object and a request for the instances of the second data object. Receiving, from each application in the first subset of the plurality of applications, the list of the set of candidate instances of data objects may include receiving from the second application a list of a second set of candidate instances of the second data object.

In some embodiments, the first requests are sent to the first subset of the plurality of applications in parallel in order for the first subset of the plurality of applications to determine the corresponding lists of candidate instances of data objects in parallel.

In some embodiments, a system includes a set of processing units and a non-transitory machine-readable medium that stores instructions. The instructions cause at least one processing unit to receive a selection of a data object relationship definition. The data object relationship definition specifies a plurality of data objects managed by a plurality of applications and a set of relationships between data objects in the plurality of data objects. The instructions further cause the at least one processing unit to send each application in a first subset of the plurality of applications a first request for instances of data objects in the plurality of data objects managed by the application. The instructions also cause the at least one processing unit to receive, from each application in the first subset of the plurality of applications, a list of a set of candidate instances of data objects. Based on the lists of sets of candidate instances of data objects, the further instructions cause the at least one processing unit to determine a set of groups of instances of data objects. Each group of instances of data objects in the set of groups of instance of data objects form a complete set of instances of data objects related to one another according to the data object relationship definition. The instructions also cause the at least one processing unit to delete a group of instances of data objects in the set of groups of instances of data objects by sending each application in a second subset of the plurality of applications a second request to delete instances of data objects in the group of instances of data objects managed by the application.

In some embodiments, a relationship in the set of relationship may specify that a first data object managed by a first application in the plurality of applications is a copy of a second data object managed by a second application in the plurality of applications. The instructions may further cause the at least one processing unit to determine instances of the first data object in the lists of sets of candidate instances of data objects that are copies of instances of the second data object in the lists of sets of candidate instances of data objects and include the determined instances of the first data object and the corresponding copies of the instances of the second data object in a list of candidate instances of data objects. Determining the set of groups of instances of data objects may be further based on the list of candidate instances of data objects. Only the determined instances of the first data object and the corresponding copies of the instances of the second data object may be included in the list of candidate instances of data objects. The instructions may further cause the at least one processing unit to not include in the list of candidate instances of data objects instances of the first data object that are not copies of instances of the second data object and not include in the list of candidate instances of data objects instances of the second data object that do not have copies of instances of the first data object.

In some embodiments, a relationship in the set of relationship may specify that a first data object managed by a first application in the plurality of applications includes a reference to a second data object managed by a second application in the plurality of applications. Sending each application in the first subset of the plurality of applications the first request for instances of data objects in the plurality of data objects managed by the application may include sending the first application the first request for instances of the first data object. Receiving, from each application in the plurality of applications, the list of the set of candidate instances of data objects may include receiving from the first application a list of a first set of candidate instances of the first data object. Sending each application in the first subset of the plurality of applications the first request for instances of data objects in the plurality of data objects managed by the application may further include, for each instance of the first data object in the list of the first set of candidate instances of the first data object, determining the reference to an instance of the second data object and sending the second application the references to the instances of the second data object and a request for the instances of the second data object. Receiving, from each application in the first subset of the plurality of applications, the list of the set of candidate instances of data objects may include receiving from the second application a list of a second set of candidate instances of the second data object.

The following detailed description and accompanying drawings provide a better understanding of the nature and advantages of various embodiments of the present disclosure.

BRIEF DESCRIPTION OF THE DRAWINGS

FIG. 2 illustrates an example data object relationship definition according to some embodiments.

FIG. 3 illustrates an example of data object metadata according to some embodiments.

FIG. 4 illustrates an example relationship definition according to some embodiments.

FIGS. 6A and 6B illustrate a dataflow for deleting complete groups of instances of related data objects distributed across applications according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for deleting data objects distributed across applications. In some embodiments, a computing system includes several applications. Each of the applications manage have their own defined data objects and, thus, manage instances of those data objects. The computing system may store a set of data object relationship definitions that define relationships between data objects managed by the applications. In response to a request received from a client device, the computing system can provide the client device a list of data object relationship definitions. The computing system may receive from the client device a selection of one of the data object relationship definitions. In response, the computing system determines the applications that manage instances of data objects specified in the data object relationship definition. Next, the computing system sends each of the determined applications a request for instances of data objects specified in the data object relationship definition that are managed by the application. In response to the request, for the data objects that each of the determined applications manages, the application sends the computing system a list of candidate instances of the data objects that the application determines are eligible to be deleted. When the computing system receives the lists of candidate instances of such data objects from the determined applications, the computing system determines groups of instances of data objects where each group of instances of data objects is a complete collection of instances of data objects defined by the data object relationship definition and are related in the same manner defined by the data object relationship definition. These groups of instances of data objects can be deleted. To delete a particular group of instances of data objects, the computing system sends each of the determine applications a request to delete the corresponding instances of data objects managed by the application.

Figure 1:
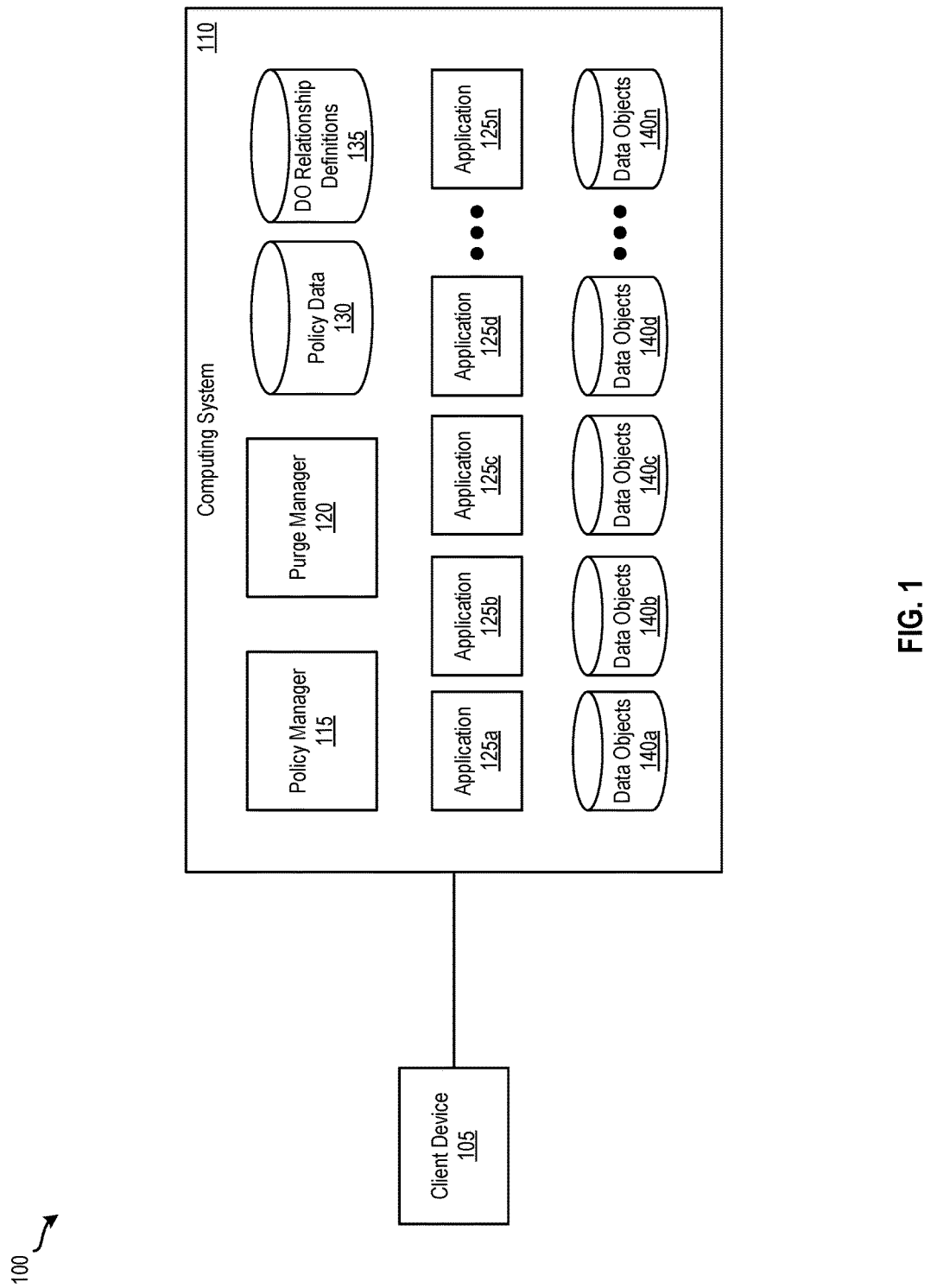
FIG. 1 illustrates a system for deleting related data objects distributed across applications according to some embodiments.

FIG. 1 illustrates a system 100 for deleting related data objects distributed across applications according to some embodiments. As shown, system 100 includes client device 105 and computing system 110. Client device 105 may communicate and interact with computing system 110. For instance, a user of client device 105 can define policy rules for applications 125a-n. The user of client device 105 may create a set of policy rules for an application 125 and send them to computing system 110 (e.g., policy manager 115). As another example, a user of client device 105 can define data object relationship definitions and send them to computing system 110 (e.g., policy manager 115). As yet another example, a user of client device 105 may send computing system 110 (e.g., purge manager) a request for data object relationship definitions. Upon receiving a list of data object relationship definitions, client device 105 may provide the list to the user (e.g., via a display of client device 105). In some cases, client device 105 can receive from the user a selection of a data object relationship definition in the list. In response to receiving the selection, client device 105 forwards the selection to computing system 110 (e.g., purge manager 120). In response to the selection, client device 105 may receive a list of a set of groups of instances of data objects that can be deleted. The user of client device 105 can select one or more groups of instances of data objects in the list of the set of groups of instances of data objects to delete. Client device 105 sends the selection(s) to computing system 110 (e.g., purge manager 120). As illustrated, FIG. 1 depicts one client device. One of ordinary skill in the art will appreciate that system 100 can include any number of additional client devices that are configured the same as or similar to client device 105.

As shown in FIG. 1, computing system 110 includes policy manager 115, purge manager 120, applications 125a-n, policy data storage 130, data object (DO) relationship definitions storage 135, and data objects storages 140a-n. Policy data storage 130 is configured to store policy data for each of the applications 125a-n. For instance, policy data stored in policy data storage 130 can include policy rules that specify how data is to be managed. Examples of policy rules include an instance of a data object cannot be deleted if its status is active, an instance of a data object cannot be deleted if the date of the last time the instance of the data object was update is less than a defined amount of time (e.g., a week, a month, three months, six months, a year, etc.), an instance of a data object cannot be deleted if the instance of the data object is classified as confidential or critical, an instance of a data object cannot be deleted if the instance of the data object was created in a defined geographical location, an instance of a data object data cannot be deleted if the instance of the data object is stored at a defined geographical location, etc.

Data object relationship definitions storage 135 stores data object relationship definitions. In some embodiments, a data object relationship definition specifies a plurality of data objects managed by a plurality of applications 125 and a set of relationships between data objects in the plurality of data objects. Each of the data objects storages 140a-n is configured to store data objects managed by a corresponding application 125 as well as instances of such data objects. In some embodiments, a data object specifies a set of attributes.

In some such embodiments, an instance of a data object includes the set of attributes specified in the data object along with a set of values for the set of attributes.

In some embodiments, storages 130, 135, and 140a-n are implemented in a single physical storage while, in other embodiments, storages 130, 135, and 140a-n may be implemented across several physical storages. While FIG. 1 shows storages 130, 135, and 140a-n as part of computing system 110, one of ordinary skill in the art will appreciate that policy data storage 130, data object relationship definitions storage 135, and/or data objects storages 140a-n may be external to computing system 110 in some embodiments.

Policy manager 115 is responsible for managing policy data for applications 125a-n. For example, policy manager 115 may receive from client device 105 a set of defined policy rules for an application 125. Once policy manager 115 receives the set of defined policy rules, policy manager 115 stores them in policy data storage 130. As another example, policy manager 115 can receive from client device 105 data object relationship definitions. In response to receiving them, policy manager 115 stores the data object relationship definitions in data object relationship definitions storage 135.

FIG. 2 illustrates an example data object relationship definition 200 according to some embodiments. As illustrated, data object relationship definition 200 includes data object relationship identifier (ID) 205, data object metadata 210, and relationship definitions 215. Data object relationship ID 205 is a unique identifier for identifying data object relationship definition 200. Data object metadata 210 includes metadata for describing a set of data objects. FIG. 3 illustrates an example of data object metadata 300 according to some embodiments. In some embodiments, data object metadata 300 is used to describe each data object specified in data object metadata 210. As depicted in FIG. 3, data object metadata 300 includes data object ID 305, application 310, and data object type 315. Data object ID 305 is a unique identifier for identifying data object 300. Application 310 specifies an application (e.g., an application 125) responsible for managing data object 300 and instances of data object 300. Data object type 315 specifies a type for data object 300. Examples of types for a data object include a primary data object and a secondary data object. Referring back to FIG. 2, relationship definitions 215 includes a set of definitions that each specifies a relationship between a pair of data objects described by data object metadata 210. FIG. 4 illustrates an example relationship definition 400 according to some embodiments. In some embodiments, relationship definition 400 is used to describe each relationship specified in relationship definitions 215. As shown, relationship definition 400 includes relationship ID 405, relationship type 410, and data object IDs 415. Relationship ID 405 is a unique identify for identifying relationship definition 400. Relationship type 410 specifies a type of relationship. Examples of types of relationships include a reference relationship indicating that a first data object references a second data object and a copy relationship indicating that a first data object is a copy of a second data object. Data object IDs 415 include a first data object ID for uniquely identifying the first data object in the relationship and a second data object ID for uniquely identifying the second data object in the relationship.

Returning to FIG. 1, purge manager 120 is configured to manage the purging (i.e., deletion) of instances of data objects managed by applications 125a-n. For instance, purge manager 120 may receive from client device 105 a request for a list of data object relationship definitions. In response, purge manager 120 accesses data object relationship definitions storage 135 to retrieve data object relationship definitions. Then, purge manager 120 sends the data object relationship definitions to client device 105. In some instances, purge manager 120 can receive a selection of a data object relationship definition. In response to the selection, purge manager 120 determines a set of applications 125 that manage data objects specified in the selected data object relationship definition. Next, purge manager 120 sends each application in the determined set of applications 125 a request for instances of data objects specified in the data object relationship definition that are managed by the application. In return, purge manager 120 can receive from each application in the determined set of applications 125 a list of a set of candidate instances of data objects.

Purge manager 120 can then perform further processing on the lists of sets of candidate instances of data objects received from the determined set of applications 125. For example, purge manager 120 may perform a set of reconciliation operations to eliminate groups of instances of data objects related to each other according to a data relationship definition that include instances of data objects that cannot be deleted from being considered for purging. In some cases, a candidate instance of a data object can include a reference to another instance of a data object managed by another application. In some such cases, purge manager 120 sends the other application that is responsible for managing the other instance of the data object the reference to the instance of the data object and a request for the instance of the data object. In some instances, purge manager 120 may perform another set of reconciliation operations on the previously received candidate instances of data objects and the newly received candidate instances of data objects (i.e., instances of data objects referenced by candidate instances of data objects in the previously received candidate instances of data objects). Purge manager 120 may continually repeat these operations until the newly received candidate instances of data objects do not include references to other instances of data objects managed by other applications. Then, based on the remaining candidate instances of data objects, purge manager 120 determines groups of instances of data objects that are each a complete collection of instances of data objects defined by the data object relationship definition and that are related to one another in the same way as that defined by the selected data object relationship definition. In some embodiments, purge manager 120 sends client device 105 a list of the groups of instances so that a user of client device 105 may select which groups to delete. Upon receiving a selected group of instances of data objects from the list of groups of instances, in some embodiments, purge manager 120 sends each of the applications 125 responsible for managing the instances of data objects in the group of instances of data objects requests to delete the respective instances of data objects. In other embodiments, purge manager 120 deletes each of the groups of instances of data objects by sending the applications 125 responsible for managing them requests to delete the respective instances of data objects.

Each of the applications 125a-n is a software application operating on computing system 110 configured to manage data objects and instances of such data objects stored in a corresponding data objects storage 140. For example, an application 125 can receive from purge manager 120 a request for instances of a set of data objects managed by the application 125. In response to the request, the application 125 accesses its data objects storage 140 to retrieve a list of the requested instances of the set of data objects. Next, the application 125 accesses policy data storage 130 to retrieve a set of policy rules defined for the application 125. Then, the application 125 applies the set of rules to candidate instances of data objects in the list of candidate instances of each data object in the set of data objects that is a primary type of data object. The application of the set of rules indicates, for each candidate instance of such data objects, whether the candidate instance of the data object can be deleted. For candidate instances of data objects indicated that they cannot be deleted, the application 125 removes them from the list of candidate instances of the set of data objects. The application 125 then sends the list of remaining candidate instances of the set of data objects to purge manager 120. In some cases, an application 115 may receive from purge manager 120 a request to delete a set of instances of data objects. In response, the application 125 accesses a corresponding data objects storage 140 and deletes the requested instances of data objects from the data objects storage 140.

Figure 5:
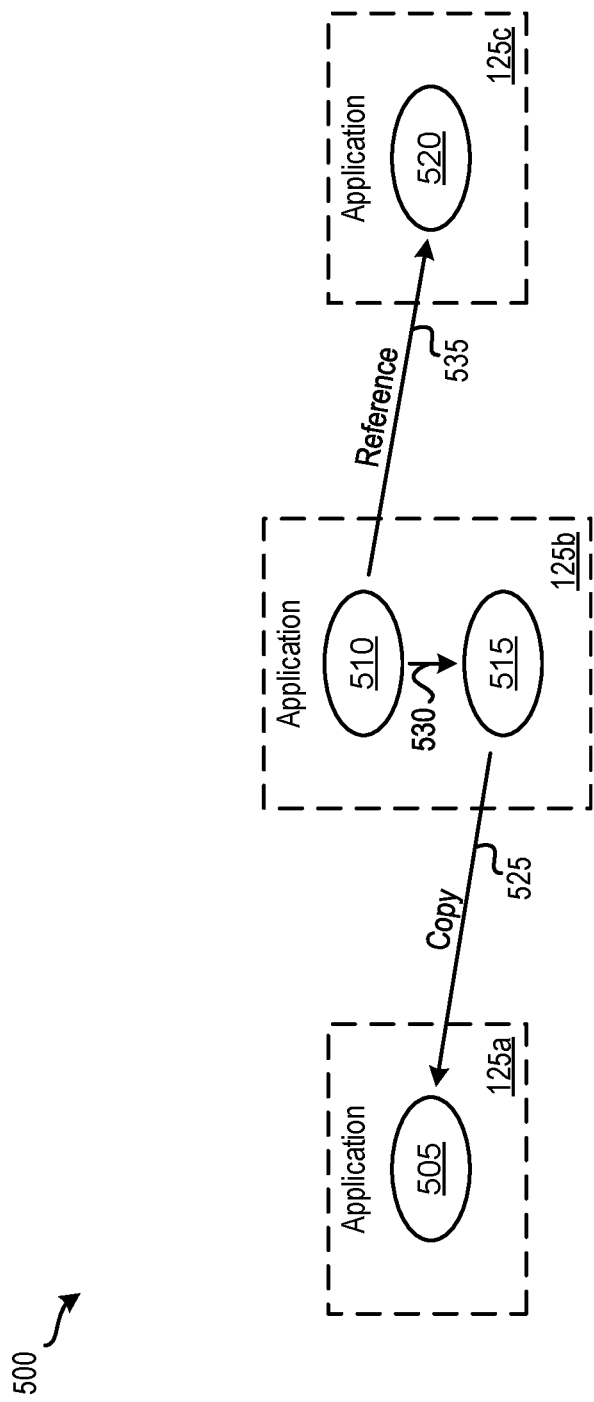
FIG. 5 illustrates an example of relationships between data objects defined in a data object relationship according to some embodiments.

An example operation will now be described by reference to FIGS. 1-5, 6A, and 6B. Specifically, this example operation shows how candidate instances of data objects specified in a data object relationship definition are determined to be deleted. A data object relationship that will be employed in this example is defined using data object relationship definition 200, data object metadata 300, and relationship definition 400. FIG. 5 illustrates an example of relationships between data objects defined in a data object relationship 500 according to some embodiments. In particular, data object relationship 500 is the data object relationship that will be used for this example operation. As shown in FIG. 5, data object relationship 500 includes data objects 505-520 and relationships 525-535. Here, application 125a is configured to manage data object 505 stored in data objects storage 140a, application 125b is configured to manage data objects 510 and 515 stored in data objects storage 140b, and application 125c is configured to manage data object 520 stored in data objects storage 140c. For this example, relationship 525 is a copy relationship where data object 505 is a copy of data object 515. Relationship 530 is a reference relationship where data object 510 includes a reference to data object 515. In addition, relationship 535 is a reference relationship where data object 510 includes a reference to data object 520. In some embodiments, a data object is a primary data object if it includes a reference to another data object or if the data object is part of a copy relationship and a data object is a secondary data object if it is referenced by another data object managed by a different application. As such, in this example, data objects 505-515 are primary data objects (data objects 505 and 515 are include in a copy relationship and data object 510 includes a reference to data object 520) and data object 520 is a secondary data object (data object 520, which is managed by application 125c, is referenced by data object 510, which is managed by application 125b).

Figure 6A:
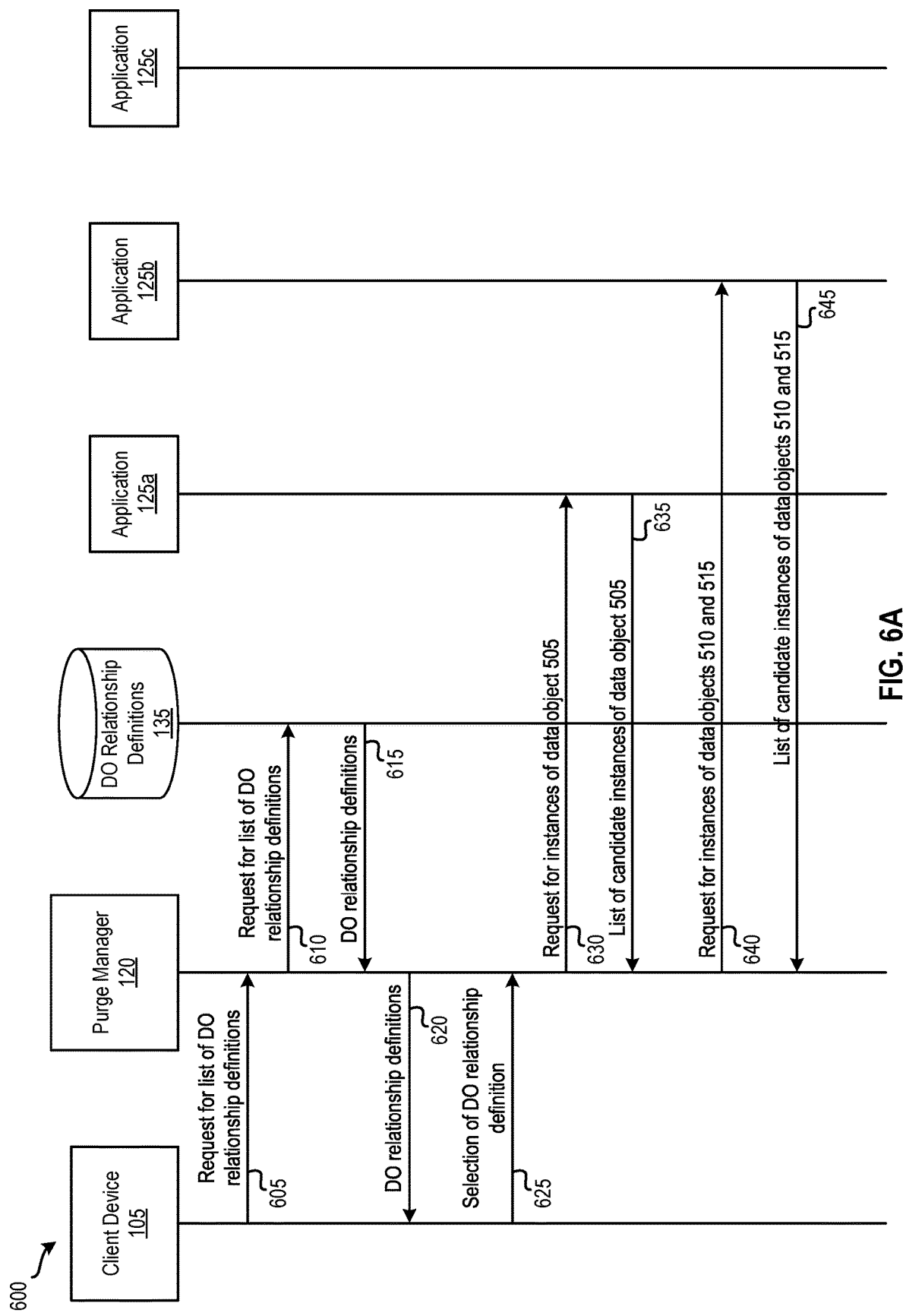

FIGS. 6A and 6B illustrate a dataflow 600 for deleting complete groups of instances of related data objects distributed across applications according to some embodiments. Referring to FIG. 6A, the example operation begins by client device 105 sending, at 605, purge manager 120 a request for a list of data object relationship definition. Upon receiving the request, purge manager 120 accesses, at 610, data object relationship definitions storage 135 and retrieves, at 615, a set of data object relationship definitions. In some embodiments, the retrieved set of data object relationship definitions are ones that are associated with a user of client device 105. Purge manager 120 sends, at 620, a list of the set of data object relationship definitions to client device 105.

At 625, the user of client device 105 sends purge manager 120 a selection of a data object relationship in the list of the set of data object relationship definitions. Here, the user of client device 105 selected data object relationship 500. In response to receiving the selection, purge manager 120 determines data objects in data object relationship 500 that are primary data objects. Accordingly, purge manager 120 determines that data objects 505-515 are primary data objects. Next, purge manager 120 sends each of the applications 125 that are configured to manage data objects 505-515 a request for instances of data objects 505-515. As depicted in FIG. 6A, purge manager 120 sends, at 630, application 125a a request for instances of data object 505. When application 125a receives the request, application 125a accesses data objects storage 140a to retrieve a list of candidate instances of data object 505. Application 125a then accesses policy data storage 130 to retrieve a set of policy rules defined for application 125a and applies the set of rules to candidate instances of data objects in the list of candidate instances of data object 505. The application of the set of rules indicates, for each instance of data object 505, whether the candidate instance of data object 505 can be deleted. Application 125a removes candidate instances of data object 505 that cannot be deleted from the list of candidate instances of data object 505. Next, application 125a sends, at 635, purge manager 120 the list of remaining candidate instances of data object 505.

Continuing with the example operation, purge manager 120 sends, at 640, application 125b a request for instances of data objects 510 and 515. In response to the request, application 125b accesses data objects storage 140b to retrieve a list of candidate instances of data objects 510 and 515. Next, application 125b accesses policy data storage 130 to retrieve a set of policy rules defined for application 125b and applies them to candidate instances of data objects in the list of candidate instances of data objects 510 and 515. The application of the set of rules indicates, for each instance of data objects 510 and 515, whether the instance of data objects 510 and 515 can be deleted. Then, application 125b removes instances of data objects 510 and 515 that cannot be deleted from the list of candidate instances of data objects 510 and 515. Application 125b then sends, at 645, purge manager 120 the list of remaining candidate instances of data objects 510 and 515. For this example, purge manager 120 sends requests 630 and 640 to applications 125a and 125b, respectively, in parallel so that applications 125a and 125b can process the requests (e.g., determine their corresponding candidate instances of data objects) in parallel.

Referring now to FIG. 6B, purge manager 120 reconciles, 650, the lists of candidate instances of data objects 505-515 received from applications 125a and 125b. In some embodiments, purge manager 120 performs different reconciliation operations on candidate instances of data objects that are in different types of relationships. For this example, data objects 505 and 515 are in a copy relationship. In this example, purge manager 120 performs a set of reconciliation operations on the lists of candidate instances of data objects 505 and 515 by determining, from the lists of candidate instances of data objects 505 and 515, candidate instances of data object 505 that are copies of candidate instances of data object 515. Then, purge manager 120 removes any candidate instances of data objects 505 and 515 that do not have copies of the other from the lists of candidate instances of data objects 505-515. Additionally, data objects 510 and 515 are in a reference relationship. For this example, purge manager 120 performs a set of reconciliation operations on the lists of candidate instances of data objects 510 and 515 by determining, from the lists of candidate instances of data objects 510 and 515, candidate instances of data object 510 that reference candidate instances of data object 515. Then, purge manager 120 removes, from the lists of candidate instances of data objects 510 and 515, any candidate instances of data object 515 that do not have a candidate instance of data object 510 that references it. Based on the lists of remaining candidate instances of data objects 505-515, purge manager 120 determines candidate instances of data objects 505-515 that include references to instances of another data object managed by another application. In this example, candidate instances of data objects 510 include references to candidate instances of data object 520. Therefore, purge manager 120 sends, at 655, application 125c a request for instances of data object 520 along with the references to the instances of data object 520 that are included in the instances of data object 515. After application 125c receives the request and the references, application 125c accesses data objects storage 140c and uses the references to retrieve a list of candidate instances of data object 520 referred by the references. Next, application 125c accesses policy data storage 130 to retrieve a set of policy rules defined for application 125c and applies the set of rules to candidate instances of data objects in the list of candidate instances of data object 520. The application of the set of rules indicates, for each instance of data object 520, whether the candidate instance of data object 520 can be deleted. The, application 125c removes candidate instances of data object 520 that cannot be deleted from the list of candidate instances of data object 520. Application 125c sends, at 660, the remaining list of candidate instances of data object 520 to purge manager 120.

Once purge manager 120 receives the list of candidate instances of data object 520, purge manager 120 reconciles, at 665, the lists of candidate instances of data objects 505-520. As mentioned above, purge manager 120 performs different reconciliation operations on instances of data objects that are in different types of relationships. Here, data objects 510 and 520 are in a reference relationship. As such, purge manager 120 performs a set of reconciliation operations on the lists of candidate instances of data objects 510 and 520 by determining, from the lists of candidate instances of data objects 510 and 520, candidate instances of data object 510 that reference candidate instances of data object 520. Next, purge manager 120 removes, from the list of candidate instances of data object 520, any candidate instances of data object 520 that do not have a candidate instance of data object 510 that references it. As there are no more data objects referenced by different applications to process, purge manager 120 determines, at 670, based on the lists of remaining candidate instances of data objects 505-520, groups of instances of data objects 505-520 that each form a complete set of instances of data objects related to one another according to data object relationship 500. For this example, such a group of instances of data objects 505-520 includes an instance of data object 505, an instance of data object 510, an instance of data object 515, and an instance of data object 520. The instance of data object 510 would include a reference to the instance of data object 515 and a reference to the instance of data object 520. Also, the instance of data object 505 would be a copy of the instance of data object 515. Therefore, for a particular group of instances of data objects related to one another according to data relationship definition 500, if the lists of candidate instances of data objects 505-520 is missing one of the instances of data objects in the particular group of instances of data objects (e.g., missing an instance of data object 505, an instance of data object 510, an instance of data object 515, and/or an instance of data object 520), purge manager 120 does not determine the particular group of instances of data objects to be one that forms a complete set of instances of data objects related to one another according to data object relationship 500. As such, the particular group of instances of data objects is prevented from being deleted.

After purge manager 120 determines the groups of instances of data objects 505-520, purge manager 120 deletes each group of instances of data objects 505-520. In this example, purge manager 120 does so by sending, at 675, application 125a a request to delete instances of data object 505 included in the groups of instances of data objects 505-520, sending, at 680, application 125b a request to delete instances of data objects 510 and 515 included in the groups of instances of data objects 505-520, and sending, at 685, application 125c a request to delete instances of data object 520 included in the groups of instances of data objects 505-520.

While this example shows purge manager 120 deleting all the groups of instances of data objects 505-520, individual groups of instances of data objects 505-520 may be deleted in some embodiments. For instance, in some such embodiments, purge manager 120 provides client device 105 a list of the groups of instances of data objects 505-520. The user of client device 105 can select a group of instance of data objects 505-520 to delete. In response to receiving the selection, purge manager 120 sends each of the applications 125a-c requests to delete corresponding instances of data objects 505-520 included in the selected group of instances of data objects 505-520. Furthermore, the example above describes how instances of data objects specified in a selected data object relationship definition are determined to be deleted. In some instances, the data objects include a time attribute (e.g., specified in data object metadata 300). In some such instances, a user of client device 105 also sends a specified period of time along with the selection of the data object relationship definition. Instances of data objects with a value for the time attribute that falls within the period of time may be deleted. Thus, the period of time is used as a filter during the process for determining instances of data objects to be deleted (e.g., requests sent to applications 125a-c include the period of time as a constraint). One of ordinary skill in the art will appreciate that data objects can include additional and/or different attributes and, thus, additional and/or different filters on those attributes can be received from a user of client device 105.

In some embodiments, each instance of a data object may include an expiration date attribute indicating that the instance of the data object can only be deleted after the expiration date is reached. For a group of instances of data objects related to each other according to a data relationship definition, different instances of data objects in the group of instances of data objects may have different expiration dates. Using the purging techniques described herein prevents the group of instances of data objects from being allowed to be deleted if a particular instance of a data object in the group of instances of data objects has an expiration date that has not been reached. This effectively extends the expiration date of this particular instance of the data object to the other instance of data objects in the group of instances of data objects.

Figure 7:
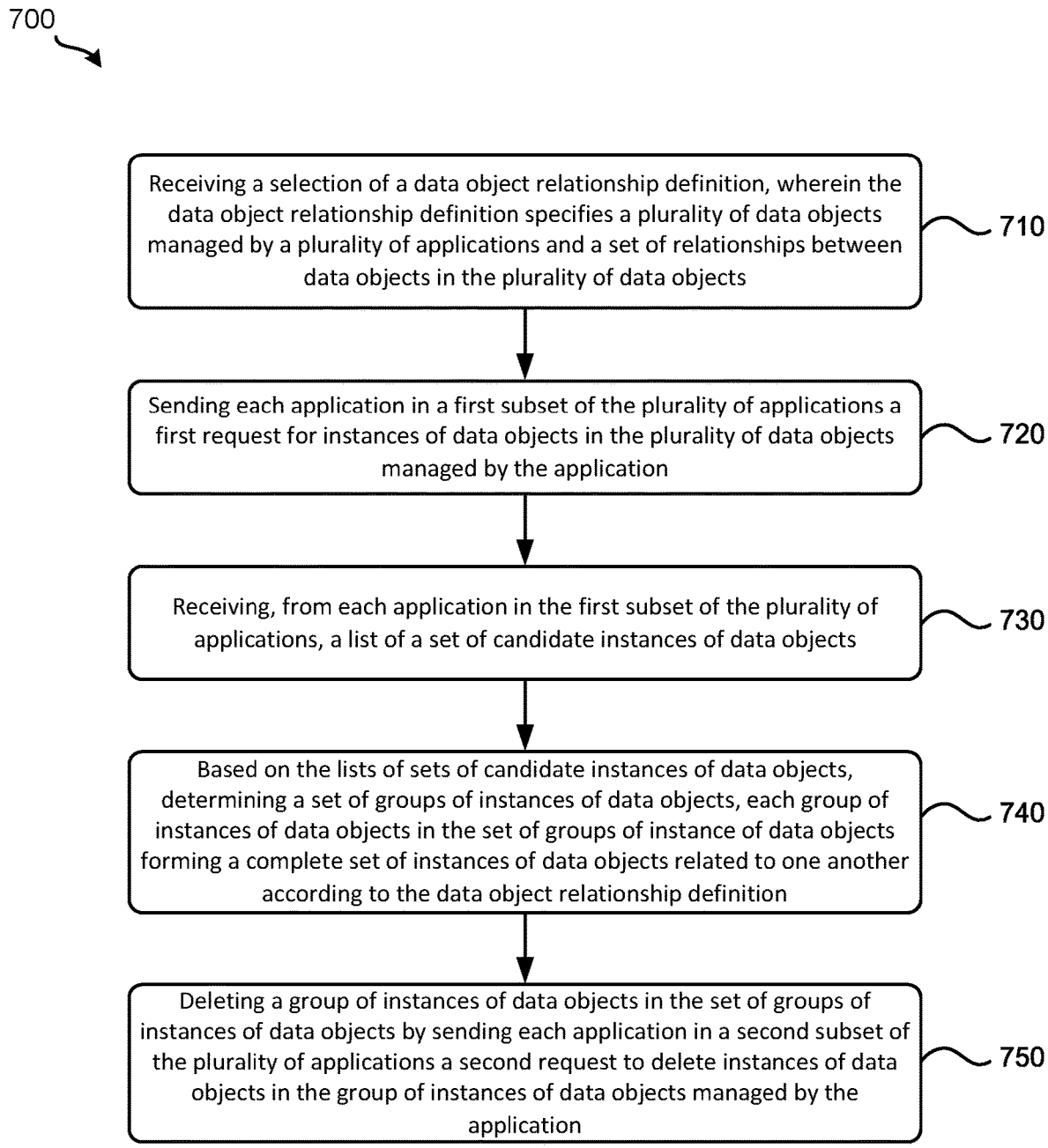
FIG. 7 illustrates a process for deleting related data objects distributed across applications according to some embodiments.

FIG. 7 illustrates a process 700 for deleting related data objects distributed across applications according to some embodiments. In some embodiments, computing system 110 performs process 700. Process 700 starts by receiving, at 710, a selection of a data object relationship definition. The data object relationship definition specifies a plurality of data objects managed by a plurality of applications and a set of relationships between data objects in the plurality of data objects. Referring to FIGS. 1, 5, and 6A as an example, purge manager 120 may receive, at 625, from client device 105 a selection of data object relationship 500.

Next, process 700 sends, at 720, each application in a first subset of the plurality of applications a first request for instances of data objects in the plurality of data objects managed by the application. Referring to FIGS. 1, 5, and 6A as an example, purge manager 120 can send, at 630 and 640, a request to application 125*a* for instances of data object 505 and a request to application 125*b* for instances of data objects 510 and 515. Process 700 then receives, at 730, from each application in the first subset of the plurality of applications, a list of a set of candidate instances of data objects. Referring to FIGS. 1, 5, and 6A as an example, purge manager 120 may receive, at 635 and 645, from application 125*a*, a list of candidate instances of data object 505 and, from application 125*b*, a list of candidate instances of data objects 510 and 515.

Based on the lists of sets of candidate instances of data objects, process 700 determines, at 740, a set of groups of instances of data objects. Each group of instances of data objects in the set of groups of instance of data objects are related to one another according to the data object relationship definition. Referring to FIGS. 1, 5, and 6B as an example, purge manager 120 can determine, at 670, groups of instances of data objects 505-520 based on the lists of candidate instances of data objects 505-520 reconciled at 665.

Finally, process 700 deletes, at 750, a group of instances of data objects in the set of groups of instances of data objects by sending each application in a second subset of the plurality of applications a second request to delete instances of data objects in the group of instances of data objects managed by the application. Referring to FIGS. 1 and 5, as explained above, in some such embodiments, purge manager 120 can provide client device 105 a list of the groups of instances of data objects 505-520. The user of client device 105 can select a group of instance of data objects 505-520 to delete. In response to receiving the selection, purge manager 120 sends each of the applications 125*a-c* requests to delete corresponding instances of data objects 505-520 included in the selected group of instances of data objects 505-520.

Figure 8:
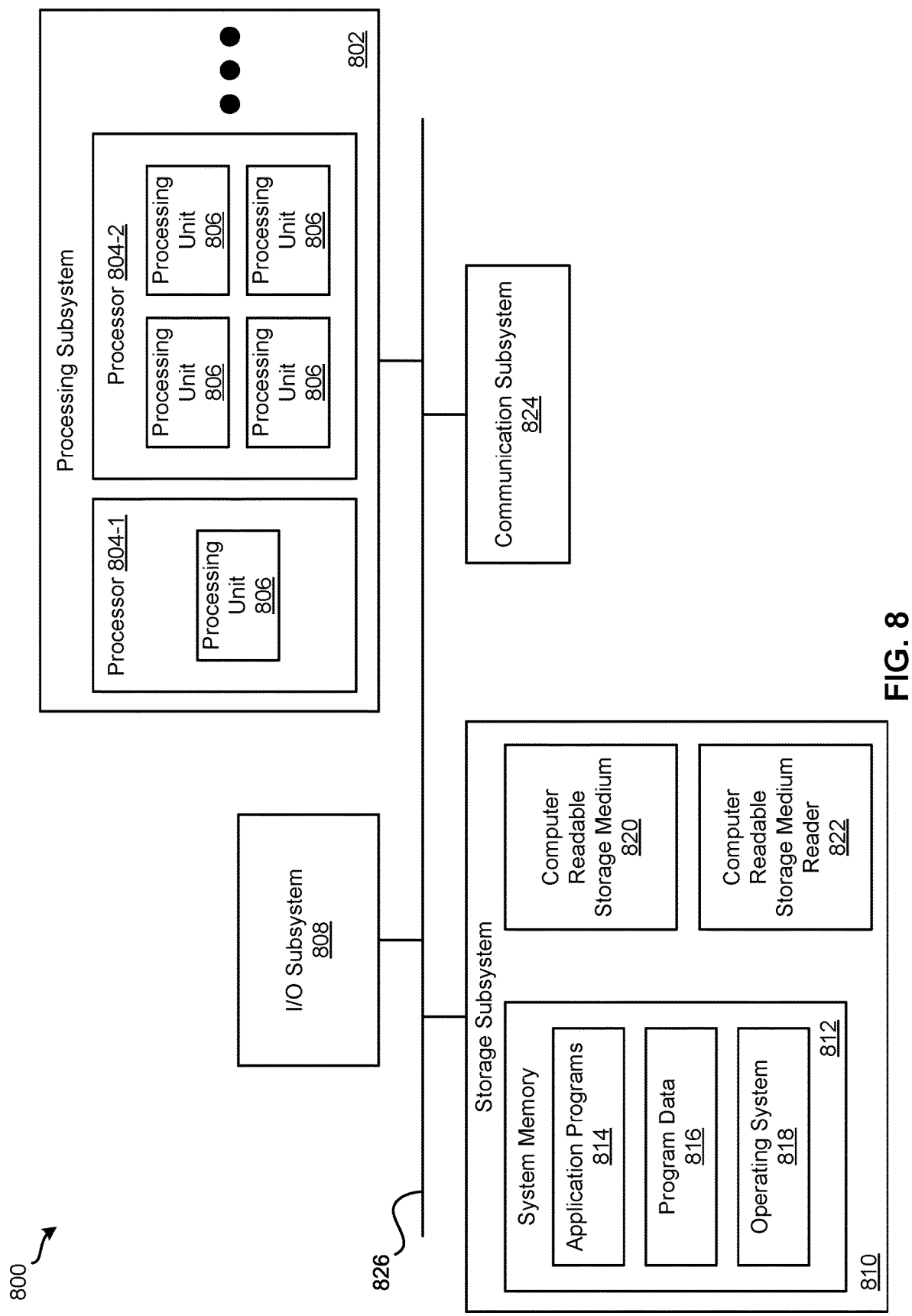
FIG. 8 illustrates an exemplary computer system, in which various embodiments may be implemented.

FIG. 8 illustrates an exemplary computer system 800 for implementing various embodiments described above. For example, computer system 800 may be used to implement client device 105 and computing system 110. Computer system 800 may be a desktop computer, a laptop, a server computer, or any other type of computer system or combination thereof. Some or all elements of policy manager 115, purge manager 120, applications 125*a-n*, or combinations thereof can be included or implemented in computer system 800. In addition, computer system 800 can implement many of the operations, methods, and/or processes described above (e.g., process 700). As shown in FIG. 8, computer system 800 includes processing subsystem 802, which communicates, via bus subsystem 826, with input/output (I/O) subsystem 808, storage subsystem 810 and communication subsystem 824.

Bus subsystem 826 is configured to facilitate communication among the various components and subsystems of computer system 800. While bus subsystem 826 is illustrated in FIG. 8 as a single bus, one of ordinary skill in the art will understand that bus subsystem 826 may be implemented as multiple buses. Bus subsystem 826 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 802, which can be implemented as one or more integrated circuits (e.g., a conventional microprocessor or microcontroller), controls the operation of computer system 800. Processing subsystem 802 may include one or more processors 804. Each processor 804 may include one processing unit 806 (e.g., a single core processor such as processor 804-1) or several processing units 806 (e.g., a multicore processor such as processor 804-2). In some embodiments, processors 804 of processing subsystem 802 may be implemented as independent processors while, in other embodiments, processors 804 of processing subsystem 802 may be implemented as multiple processors integrate into a single chip or multiple chips. Still, in some embodiments, processors 804 of processing subsystem 802 may be implemented as a combination of independent processors and multiple processors integrated into a single chip or multiple chips.

In some embodiments, processing subsystem 802 can execute a variety of programs or processes in response to program code and can maintain multiple concurrently executing programs or processes. At any given time, some or all of the program code to be executed can reside in processing subsystem 802 and/or in storage subsystem 810. Through suitable programming, processing subsystem 802 can provide various functionalities, such as the functionalities described above by reference to process 700.

I/O subsystem 808 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 800 to a user or another device (e.g., a printer).

As illustrated in FIG. 8, storage subsystem 810 includes system memory 812, computer-readable storage medium 820, and computer-readable storage medium reader 822. System memory 812 may be configured to store software in the form of program instructions that are loadable and executable by processing subsystem 802 as well as data generated during the execution of program instructions. In some embodiments, system memory 812 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 812 may include different types of memory, such as static random access memory (SRAM) and/or dynamic random access memory (DRAM). System memory 812 may include a basic input/output system (BIOS), in some embodiments, that is configured to store basic routines to facilitate transferring information between elements within computer system 800 (e.g., during start-up). Such a BIOS may be stored in ROM (e.g., a ROM chip), flash memory, or any other type of memory that may be configured to store the BIOS.

As shown in FIG. 8, system memory 812 includes application programs 814 (e.g., application 115), program data 816, and operating system (OS) 818. OS 818 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 820 may be a non-transitory computer-readable medium configured to store software (e.g., programs, code modules, data constructs, instructions, etc.). Many of the components (e.g., policy manager 115, purge manager 120, and applications 125a-n) and/or processes (e.g., process 700) described above may be implemented as software that when executed by a processor or processing unit (e.g., a processor or processing unit of processing subsystem 802) performs the operations of such components and/or processes. Storage subsystem 810 may also store data used for, or generated during, the execution of the software.

Storage subsystem 810 may also include computer-readable storage medium reader 822 that is configured to communicate with computer-readable storage medium 820. Together and, optionally, in combination with system memory 812, computer-readable storage medium 820 may comprehensively represent remote, local, fixed, and/or removable storage devices plus storage media for temporarily and/or more permanently containing, storing, transmitting, and retrieving computer-readable information.

Computer-readable storage medium 820 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 824 serves as an interface for receiving data from, and transmitting data to, other devices, computer systems, and networks. For example, communication subsystem 824 may allow computer system 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 824 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 824 may provide components configured for wired communication (e.g., Ethernet) in addition to or instead of components configured for wireless communication.

One of ordinary skill in the art will realize that the architecture shown in FIG. 8 is only an example architecture of computer system 800, and that computer system 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
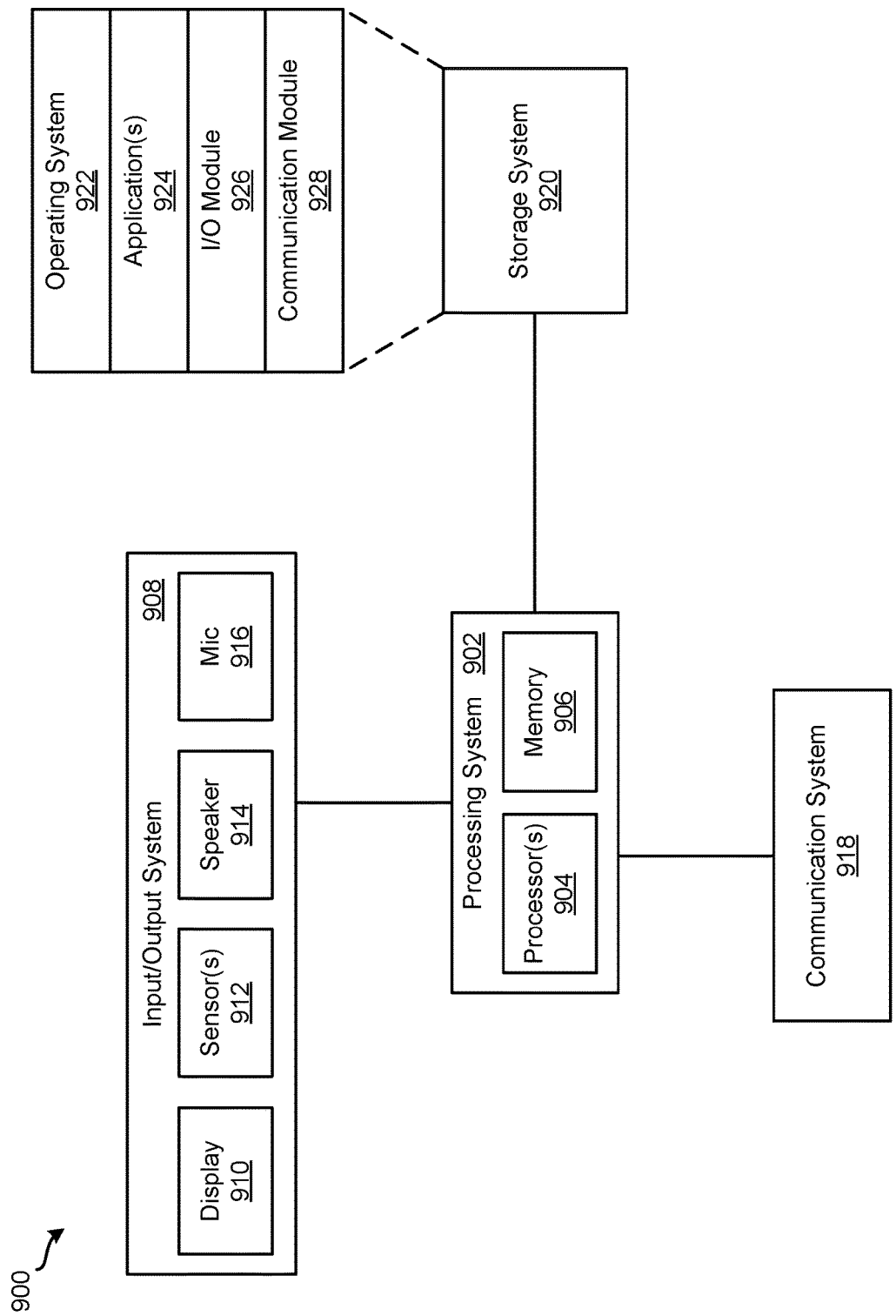
FIG. 9 illustrates an exemplary computing device, in which various embodiments may be implemented.

FIG. 9 illustrates an exemplary computing device 900 for implementing various embodiments described above. For example, computing device 900 may be used to implement client device 105. Computing device 900 may be a cell-phone, a smartphone, a wearable device, an activity tracker or manager, a tablet, a personal digital assistant (PDA), a media player, or any other type of mobile computing device or combination thereof. As shown in FIG. 9, computing device 900 includes processing system 902, input/output (I/O) system 908, communication system 918, and storage system 920. These components may be coupled by one or more communication buses or signal lines.

Processing system 902, which can be implemented as one or more integrated circuits (e.g., a conventional microprocessor or microcontroller), controls the operation of computing device 900. As shown, processing system 902 includes one or more processors 904 and memory 906. Processors 904 are configured to run or execute various software and/or sets of instructions stored in memory 906 to perform various functions for computing device 900 and to process data.

Each processor of processors 904 may include one processing unit (e.g., a single core processor) or several processing units (e.g., a multicore processor). In some embodiments, processors 904 of processing system 902 may be implemented as independent processors while, in other embodiments, processors 904 of processing system 902 may be implemented as multiple processors integrate into a single chip. Still, in some embodiments, processors 904 of processing system 902 may be implemented as a combination of independent processors and multiple processors integrated into a single chip.

Memory 906 may be configured to receive and store software (e.g., operating system 922, applications 924, I/O module 926, communication module 928, etc. from storage system 920) in the form of program instructions that are loadable and executable by processors 904 as well as data generated during the execution of program instructions. In some embodiments, memory 906 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 908 is responsible for receiving input through various components and providing output through various components. As shown for this example, I/O system 908 includes display 910, one or more sensors 912, speaker 914, and microphone 916. Display 910 is configured to output visual information (e.g., a graphical user interface (GUI) generated and/or rendered by processors 904). In some embodiments, display 910 is a touch screen that is configured to also receive touch-based input. Display 910 may be implemented using liquid crystal display (LCD) technology, light-emitting diode (LED) technology, organic LED (OLED) technology, organic electro luminescence (OEL) technology, or any other type of display technologies. Sensors 912 may include any number of different types of sensors for measuring a physical quantity (e.g., temperature, force, pressure, acceleration, orientation, light, radiation, etc.). Speaker 914 is configured to output audio information and microphone 916 is configured to receive audio input. One of ordinary skill in the art will appreciate that I/O system 908 may include any number of additional, fewer, and/or different components. For instance, I/O system 908 may include a keypad or keyboard for receiving input, a port for transmitting data, receiving data and/or power, and/or communicating with another device or component, an image capture component for capturing photos and/or videos, etc.

Communication system 918 serves as an interface for receiving data from, and transmitting data to, other devices, computer systems, and networks. For example, communication system 918 may allow computing device 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 918 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 918 may provide components configured for wired communication (e.g., Ethernet) in addition to or instead of components configured for wireless communication.

Storage system 920 handles the storage and management of data for computing device 900. Storage system 920 may be implemented by one or more non-transitory machine-readable mediums that are configured to store software (e.g., programs, code modules, data constructs, instructions, etc.) and store data used for, or generated during, the execution of the software.

In this example, storage system 920 includes operating system 922, one or more applications 924, I/O module 926, and communication module 928. Operating system 922 includes various procedures, sets of instructions, software components and/or drivers for controlling and managing general system tasks (e.g., memory management, storage device control, power management, etc.) and facilitates communication between various hardware and software components. Operating system 922 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 924 can include any number of different applications installed on computing device 900. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 926 manages information received via input components (e.g., display 910, sensors 912, and microphone 916) and information to be outputted via output components (e.g., display 910 and speaker 914). Communication module 928 facilitates communication with other devices via communication system 918 and includes various software components for handling data received from communication system 918.

One of ordinary skill in the art will realize that the architecture shown in FIG. 9 is only an example architecture of computing device 900, and that computing device 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
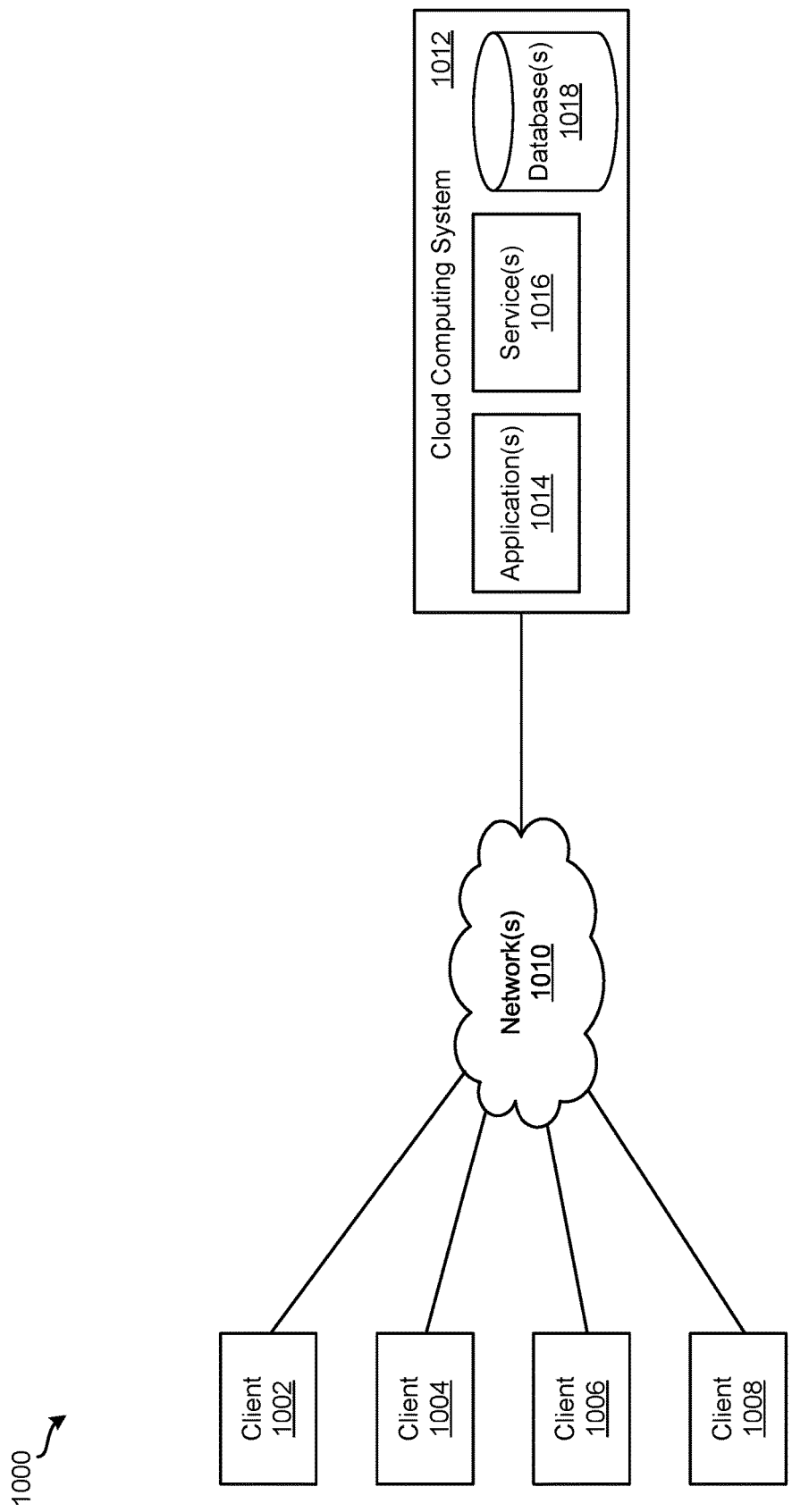
FIG. 10 illustrates an exemplary system, in which various embodiments may be implemented.

FIG. 10 illustrates an exemplary system 1000 for implementing various embodiments described above. For example, one of the client devices 1002-1008 may be used to implement client device 105 and cloud computing system may be used to implement computing system 110. As shown, system 1000 includes client devices 1002-1008, one or more networks 1010, and cloud computing system 1012. Cloud computing system 1012 is configured to provide resources and data to client devices 1002-1008 via networks 1010. In some embodiments, cloud computing system 1000 provides resources to any number of different users (e.g., customers, tenants, organizations, etc.). Cloud computing system 1012 may be implemented by one or more computer systems (e.g., servers), virtual machines operating on a computer system, or a combination thereof.

As shown, cloud computing system 1012 includes one or more applications 1014, one or more services 1016, and one or more databases 1018. Cloud computing system 1000 may provide applications 1014, services 1016, and databases 1018 to any number of different customers in a self-service, subscription-based, elastically scalable, reliable, highly available, and secure manner.

In some embodiments, cloud computing system 1000 may be adapted to automatically provision, manage, and track a customer's subscriptions to services offered by cloud computing system 1000. Cloud computing system 1000 may provide cloud services via different deployment models. For example, cloud services may be provided under a public cloud model in which cloud computing system 1000 is owned by an organization selling cloud services and the cloud services are made available to the general public or different industry enterprises. As another example, cloud services may be provided under a private cloud model in which cloud computing system 1000 is operated solely for a single organization and may provide cloud services for one or more entities within the organization. The cloud services may also be provided under a community cloud model in which cloud computing system 1000 and the cloud services provided by cloud computing system 1000 are shared by several organizations in a related community. The cloud services may also be provided under a hybrid cloud model, which is a combination of two or more of the aforementioned different models.

In some instances, any one of applications 1014, services 1016, and databases 1018 made available to client devices 1002-1008 via networks 1010 from cloud computing system 1012 is referred to as a "cloud service." Typically, servers and systems that make up cloud computing system 1012 are different from the on-premises servers and systems of a customer. For example, cloud computing system 1012 may host an application and a user of one of client devices 1002-1008 may order and use the application via networks 1010.

Applications 1014 may include software applications that are configured to execute on cloud computing system 1012 (e.g., a computer system or a virtual machine operating on a computer system) and be accessed, controlled, managed, etc. via client devices 1002-1008. In some embodiments, applications 1014 may include server applications and/or mid-tier applications (e.g., HTTP (hypertext transport protocol) server applications, FTP (file transfer protocol) server applications, CGI (common gateway interface) server applications, JAVA server applications, etc.). Services 1016 are software components, modules, application, etc. that are configured to execute on cloud computing system 1012 and provide functionalities to client devices 1002-1008 via networks 1010. Services 1016 may be web-based services or on-demand cloud services.

Databases 1018 are configured to store and/or manage data that is accessed by applications 1014, services 1016, and/or client devices 1002-1008. For instance, storages 130-140 may be stored in databases 1018. Databases 1018 may reside on a non-transitory storage medium local to (and/or resident in) cloud computing system 1012, in a storage-area network (SAN), on a non-transitory storage medium local located remotely from cloud computing system 1012. In some embodiments, databases 1018 may include relational databases that are managed by a relational database management system (RDBMS). Databases 1018 may be a column-oriented databases, row-oriented databases, or a combination thereof. In some embodiments, some or all of databases 1018 are in-memory databases. That is, in some such embodiments, data for databases 1018 are stored and managed in memory (e.g., random access memory (RAM)).

Client devices 1002-1008 are configured to execute and operate a client application (e.g., a web browser, a proprietary client application, etc.) that communicates with applications 1014, services 1016, and/or databases 1018 via networks 1010. This way, client devices 1002-1008 may access the various functionalities provided by applications 1014, services 1016, and databases 1018 while applications 1014, services 1016, and databases 1018 are operating (e.g., hosted) on cloud computing system 1000. Client devices 1002-1008 may be computer system 800 or computing device 900, as described above by reference to FIGS. 8 and 9, respectively. Although system 1000 is shown with four client devices, any number of client devices may be supported.

Networks 1010 may be any type of network configured to facilitate data communications among client devices 1002-1008 and cloud computing system 1012 using any of a variety of network protocols. Networks 1010 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
   receiving a selection of a data object relationship definition, wherein the data object relationship definition specifies a plurality of data objects managed by a plurality of applications and a set of relationships between data objects in the plurality of data objects;
   sending each application in a first subset of the plurality of applications a first request for instances of data objects in the plurality of data objects managed by the application;
   receiving, from each application in the first subset of the plurality of applications, a list of a set of candidate instances of data objects;
   and
   deleting a group of instances of data objects in the lists of sets of candidate instances of data objects, the group forming a complete set of instances of data objects related to one another according to the data object relationship definition by sending each application in a second subset of the plurality of applications a second request to delete instances of data objects in the group of instances of data objects managed by the application.

2. The non-transitory machine-readable medium of claim 1, wherein a relationship in the set of relationship specifies that a first data object managed by a first application in the plurality of applications is a copy of a second data object managed by a second application in the plurality of applications, wherein the program further comprises sets of instructions for:
   determining instances of the first data object in the lists of sets of candidate instances of data objects that are copies of instances of the second data object in the lists of sets of candidate instances of data objects;
   including the determined instances of the first data object and the corresponding copies of the instances of the second data object in a list of candidate instances of data objects; and
   determining the group of instances of data objects forms the complete set of instances of data objects related to one another according to the data object relationship definition based on the list of candidate instances of data objects.

3. The non-transitory machine-readable medium of claim 2, wherein only the determined instances of the first data object and the corresponding copies of the instances of the second data object are included in the list of candidate instances of data objects.

4. The non-transitory machine-readable medium of claim 2, wherein the program further comprises sets of instructions for:
   not including in the list of candidate instances of data objects instances of the first data object that are not copies of instances of the second data object; and
   not including in the list of candidate instances of data objects instances of the second data object that do not have copies of instances of the first data object.

5. The non-transitory machine-readable medium of claim 1, wherein a relationship in the set of relationship specifies that a first data object managed by a first application in the plurality of applications includes a reference to a second data object managed by a second application in the plurality of applications, wherein sending each application in the first subset of the plurality of applications the first request for instances of data objects in the plurality of data objects managed by the application comprises sending the first application the first request for instances of the first data object, wherein receiving, from each application in the plurality of applications, the list of the set of candidate instances of data objects comprises receiving from the first application a list of a first set of candidate instances of the first data object.

6. The non-transitory machine-readable medium of claim 5, wherein sending each application in the first subset of the plurality of applications the first request for instances of data objects in the plurality of data objects managed by the application further comprises:
   for each instance of the first data object in the list of the first set of candidate instances of the first data object, determining the reference to an instance of the second data object; and
   sending the second application the references to the instances of the second data object and a request for the instances of the second data object,
   wherein receiving, from each application in the first subset of the plurality of applications, the list of the set of candidate instances of data objects comprises receiving from the second application a list of a second set of candidate instances of the second data object.

7. The non-transitory machine-readable medium of claim 1, wherein the group of instances of data objects is a first group of instances of data objects, wherein the program further comprises sets of instructions for:
   based on the lists of sets of candidate instances of data objects, determining a second group of instances of data objects missing an instance of at least one data object in the plurality of data objects specified in the data object relationship definition; and
   not deleting the second group of instances of data objects.

8. A method comprising:
   receiving a selection of a data object relationship definition, wherein the data object relationship definition specifies a plurality of data objects managed by a plurality of applications and a set of relationships between data objects in the plurality of data objects;
   sending each application in a first subset of the plurality of applications a first request for instances of data objects in the plurality of data objects managed by the application;
   receiving, from each application in the first subset of the plurality of applications, a list of a set of candidate instances of data objects; and
   deleting a group of instances of data objects in the lists of sets of candidate instances of data objects, the group forming a complete set of instances of data objects related to one another according to the data object relationship definition by sending each application in a second subset of the plurality of applications a second request to delete instances of data objects in the group of instances of data objects managed by the application.

9. The method of claim 8, wherein a relationship in the set of relationship specifies that a first data object managed by a first application in the plurality of applications is a copy of a second data object managed by a second application in the plurality of applications, the method further comprising:
   determining instances of the first data object in the lists of sets of candidate instances of data objects that are copies of instances of the second data object in the lists of sets of candidate instances of data objects; and
   including the determined instances of the first data object and the corresponding copies of the instances of the second data object in a list of candidate instances of data objects; and
   determining the group of instances of data objects forms the complete set of instances of data objects related to one another according to the data object relationship definition based on the list of candidate instances of data objects.

10. The method of claim 9, wherein only the determined instances of the first data object and the corresponding copies of the instances of the second data object are included in the list of candidate instances of data objects.

11. The method of claim 9 further comprising:
    not including in the list of candidate instances of data objects instances of the first data object that are not copies of instances of the second data object; and
    not including in the list of candidate instances of data objects instances of the second data object that do not have copies of instances of the first data object.

12. The method of claim 8, wherein a relationship in the set of relationship specifies that a first data object managed by a first application in the plurality of applications includes a reference to a second data object managed by a second application in the plurality of applications, wherein sending each application in the first subset of the plurality of applications the first request for instances of data objects in the plurality of data objects managed by the application comprises sending the first application the first request for instances of the first data object, wherein receiving, from each application in the plurality of applications, the list of the set of candidate instances of data objects comprises receiving from the first application a list of a first set of candidate instances of the first data object.

13. The method of claim 12, wherein sending each application in the first subset of the plurality of applications the first request for instances of data objects in the plurality of data objects managed by the application further comprises:

for each instance of the first data object in the list of the first set of candidate instances of the first data object, determining the reference to an instance of the second data object; and sending the second application the references to the instances of the second data object and a request for the instances of the second data object, wherein receiving, from each application in the first subset of the plurality of applications, the list of the set of candidate instances of data objects comprises receiving from the second application a list of a second set of candidate instances of the second data object.

14. The method of claim 8, wherein the first requests are sent to the first subset of the plurality of applications in parallel in order for the first subset of the plurality of applications to determine the corresponding lists of candidate instances of data objects in parallel.

15. A system comprising:

a set of processing units; and a non-transitory machine-readable medium storing instructions that when executed by at least one processing unit in the set of processing units cause the at least one processing unit to:

receive a selection of a data object relationship definition, wherein the data object relationship definition specifies a plurality of data objects managed by a plurality of applications and a set of relationships between data objects in the plurality of data objects;

send each application in a first subset of the plurality of applications a first request for instances of data objects in the plurality of data objects managed by the application;

receive, from each application in the first subset of the plurality of applications, a list of a set of candidate instances of data objects; and delete a group of instances of data objects in the lists of sets of candidate instances of data objects, the group forming a complete set of instances of data objects related to one another according to the data object relationship definition by sending each application in a second subset of the plurality of applications a second request to delete instances of data objects in the group of instances of data objects managed by the application.

16. The system of claim 15, wherein a relationship in the set of relationship specifies that a first data object managed by a first application in the plurality of applications is a copy of a second data object managed by a second application in the plurality of applications, wherein the instructions further cause the at least one processing unit to:

determine instances of the first data object in the lists of sets of candidate instances of data objects that are copies of instances of the second data object in the lists of sets of candidate instances of data objects; and include the determined instances of the first data object and the corresponding copies of the instances of the second data object in a list of candidate instances of data objects; and determining the group of instances of data objects forms the complete set of instances of data objects related to one another according to the data object relationship definition is further based on the list of candidate instances of data objects.

17. The system of claim 16, wherein only the determined instances of the first data object and the corresponding copies of the instances of the second data object are included in the list of candidate instances of data objects.

18. The system of claim 16, wherein the instructions further cause the at least one processing unit to:

not include in the list of candidate instances of data objects instances of the first data object that are not copies of instances of the second data object; and not include in the list of candidate instances of data objects instances of the second data object that do not have copies of instances of the first data object.

19. The system of claim 15, wherein a relationship in the set of relationship specifies that a first data object managed by a first application in the plurality of applications includes a reference to a second data object managed by a second application in the plurality of applications, wherein sending each application in the first subset of the plurality of applications the first request for instances of data objects in the plurality of data objects managed by the application comprises sending the first application the first request for instances of the first data object, wherein receiving, from each application in the plurality of applications, the list of the set of candidate instances of data objects comprises receiving from the first application a list of a first set of candidate instances of the first data object.

20. The system of claim 15, wherein sending each application in the first subset of the plurality of applications the first request for instances of data objects in the plurality of data objects managed by the application further comprises:

for each instance of the first data object in the list of the first set of candidate instances of the first data object, determining the reference to an instance of the second data object; and sending the second application the references to the instances of the second data object and a request for the instances of the second data object, wherein receiving, from each application in the first subset of the plurality of applications, the list of the set of candidate instances of data objects comprises receiving from the second application a list of a second set of candidate instances of the second data object.

* * * * *